United States Patent [19]
Kuruma

[11] Patent Number: 6,018,204
[45] Date of Patent: Jan. 25, 2000

[54] POWER SUPPLY SYSTEM

[75] Inventor: Akio Kuruma, Tokyo, Japan

[73] Assignee: NEC Corporation, Tokyo, Japan

[21] Appl. No.: 09/007,047

[22] Filed: Jan. 14, 1998

[30] Foreign Application Priority Data

Jan. 16, 1997 [JP] Japan .................................. 9-005351

[51] Int. Cl.⁷ .................................................. G06F 11/16
[52] U.S. Cl. .............................. 307/64; 307/66; 307/80; 307/85
[58] Field of Search .................. 307/43, 44, 45, 307/64, 65, 66, 80, 85, 86, 87

[56] References Cited

U.S. PATENT DOCUMENTS

| | | | |
|---|---|---|---|
| 5,381,554 | 1/1995 | Langer et al. | 395/750 |
| 5,616,968 | 4/1997 | Fujii et al. | 307/66 |
| 5,621,254 | 4/1997 | Takeda et al. | 307/64 |
| 5,668,417 | 9/1997 | Wiscombe et al. | 307/64 |
| 5,726,506 | 3/1998 | Wood | 307/147 |
| 5,745,670 | 4/1998 | Linde | 395/182.2 |

FOREIGN PATENT DOCUMENTS 5-274061  10/1993  Japan .

*Primary Examiner*—Albert W. Paladini
*Attorney, Agent, or Firm*—Whitham, Curtis & Whitham

[57] ABSTRACT

A power supply system is made up of a plurality of power supply devices including M (M is a positive integer number) redundant power supply devices. The power supply system includes redundant abnormality detecting means for detecting that an abnormality occurs in at least one of the M redundant power supply devices in accordance with first signals outputted from the power supply devices. Each of the first signals indicates corresponding one of the power supply devices is in an abnormal state.

12 Claims, 13 Drawing Sheets

| INPUT TERMINAL | | | | | | OUTPUT TERMINAL | | | | | | | |
|---|---|---|---|---|---|---|---|---|---|---|---|---|---|
| ENABLE TERMINAL | | SELECT TERMINAL | | | Y0 | Y1 | Y2 | Y3 | Y4 | Y5 | Y6 | Y7 |
| G1 | $\overline{G2^*}$ | C | B | A | | | | | | | | |
| X | H | X | X | X | H | H | H | H | H | H | H | H |
| L | X | X | X | X | H | H | H | H | H | H | H | H |
| H | L | L | L | L | L | H | H | H | H | H | H | H |
| H | L | L | L | H | H | L | H | H | H | H | H | H |
| H | L | L | H | L | H | H | L | H | H | H | H | H |
| H | L | L | H | H | H | H | H | L | H | H | H | H |
| H | L | H | L | L | H | H | H | H | L | H | H | H |
| H | L | H | L | H | H | H | H | H | H | L | H | H |
| H | L | H | H | L | H | H | H | H | H | H | L | H |
| H | L | H | H | H | H | H | H | H | H | H | H | L |

$\overline{G2^*} = \overline{G2A} \cdot \overline{G2B}$

FIG.6

POWER SUPPLY SYSTEM

BACKGROUND OF THE INVENTION

The present invention relates to a power supply system, and more particularly, to a power supply system having a plurality of power supply devices with a redundant power supply device.

An example of this type of a conventional power supply system is disclosed in Japanese Patent Application Laid-Open No. Hei 5-274061. The power supply system disclosed in this publication is designed such that a plurality of power supply modules are connected in parallel. Each of the plurality of power supply modules includes a switching circuit that outputs an output voltage by a switching operation and an abnormality detecting circuit that detects an abnormality of the output voltage outputted from the switching circuit. In the conventional power supply system of this type, when the abnormality occurs in at least one of the plurality of power supply modules, the abnormality detecting circuit connected to an abnormal power supply module detects the abnormality and outputs an abnormality signal. The abnormality signal outputted from the abnormality detecting circuit is inputted to the corresponding switching circuit, and then, the switching circuit stops its switching operation. At the same time, the switching circuit makes an LED corresponding to the abnormal power supply module turn on. Upon recognizing that the LED is luminous, a maintenance keeper removes the power supply module corresponding to the luminous LED, whereby the abnormal power supply module is removed from the power supply system.

In the above-described conventional power supply system, even if it has a redundancy, it cannot be discriminated whether abnormality occurs in an essential power supply device for the power supply system or in a redundant power supply device. Therefore, the conventional power supply system has a problem that the entire power supply system must be stopped to remove the abnormal power supply device, even in a case where there is no necessity of stopping the entire power supply system because the abnormality merely occurs in the redundant power supply device.

SUMMARY OF THE INVENTION

An object of the present invention is to provide a power supply system which is capable of readily discriminating whether the abnormality occurs in an essential power supply device for guaranteeing the performance of the power supply system or in a redundant power supply device, when abnormality occurs in any one or ones of a plurality of power supply devices contained in a power supply system.

Another object of the present invention is to provide a power supply system having high maintainability and availability.

Still another object of the present invention is to provide a power supply system which is not affected by noises such as a chatter when the power supply device is replaced by a new one without stopping the power supply system (hereinafter referred to as "Hot Swap").

According to an aspect of the present invention, there is provided a power supply system which comprises a plurality of power supply devices including M (M is an integer number) redundant power supply devices, and first abnormality detecting means for detecting that an abnormality occurs in at least one of said M redundant power supply devices in accordance with first signals outputted from said power supply devices, each of said first signals indicates corresponding one of said power supply devices is in an abnormal state.

BRIEF DESCRIPTION OF THE DRAWINGS

Other features and advantages of the present invention will be made more apparent by the detailed description hereunder taken in conjunction with the accompanying drawings, wherein:

FIG. 6 is a diagram showing the function of a decoder 125 according to the first embodiment of the present invention;

In the drawings, the same reference numerals represent the same structural elements.

DETAILED DESCRIPTION OF THE PREFERRED EMBODIMENTS

Figure 1:
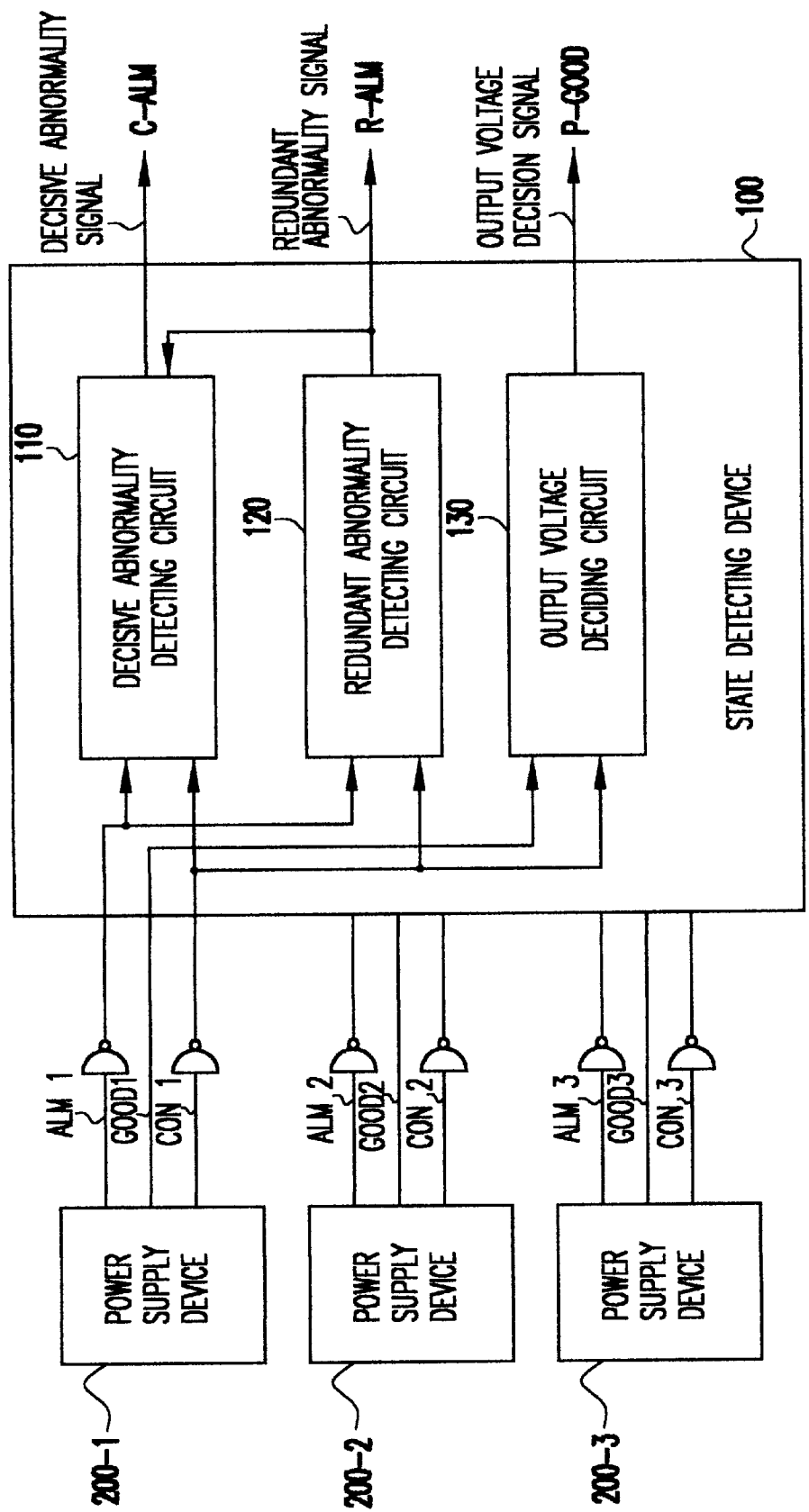
FIG. 1 is a structural diagram of a first embodiment of the present invention.

First, a first embodiment of the present invention is described below in detail, referring to the drawings.

In this embodiment, a power supply system operates in any one of two modes, when the number of power supply devices which a power supply system minimally needs is N (N is an integer number more than 0) at the time of supplying voltage to a maximum load. One is a mode which N power supply devices operates in parallel (hereinafter referred to as "non-redundant operation mode"). The other is a mode which (N+M) (M is an integer number more than 0) power supply devices operate in parallel (hereinafter referred to as "redundant operation mode"), namely, M power supply devices are added to the N power supply devices as redundant power supply devices. In this embodiment, for example, N and M are decided N=2 and M=1, respectively.

Referring to FIG. 1, a power supply system includes a plurality of power supply devices 200-1, 200-2 and 200-3, and a state detecting device 100 connected with the plurality of power supply devices 200-1, 200-2 and 200-3. Each of the plurality of power supply devices 200-1, 200-2 and 200-3 enables Hot Swap which signifies at least one of the power supply devices is exchanged during power supply operation without stoping the power supply system. Each of the power supply devices outputs a connection state signal CONn* (hereinafter, n is an integer number more than 0 representative of number of the power supply device, and a symbol * means that a transistor-transistor logic (TTL) level is "L" in a significant state), an output voltage decision signal GOODn and a power supply abnormality signal ALMn* to the state detecting circuit 100. The connection state signal CONn* indicates that the correspond power supply device is mounted on an appropriate mount place where it should be mounted when it is "L" in the TTL level. The output voltage decision signal GOODn indicates that an output voltage value of a subject power supply device is normal when it is "H" in the TTL level, which is the significant state. The power supply abnormality signal ALMn* indicates that the abnormality occurs in the subject power supply device.

The state detecting circuit 100 includes a decisive abnormality detecting circuit 110, a redundant abnormality detecting circuit 120 and an output voltage deciding circuit 130. The decisive abnormality detecting circuit 110 detects whether the plurality of power supply devices 200-1 to 200-3 are in a decisive abnormal state or not, that is, the power supply devices required at the minimum in the structure of the power supply system are in an abnormal state or not, according to a detection result from the redundant abnormality detecting circuit 120, the power supply abnormality signal ALMn*outputted from the respective power supply devices 200-1, 200-2 and 200-3 and the connection state signal CONn* outputted from the respective power supply devices 200-1, 200-2 and 200-3. The redundant abnormality detecting circuit 120 detects whether a redundant power device of the plural power supply devices 200-1, 200-2 and 200-3 are in an abnormal state or not, according to the power supply abnormality signal ALMn* and the connection state signal CONn* outputted from the respective power supply devices 200-1, 200-2 and 200-3, respectively. The output voltage deciding circuit 130 detects whether the plural power supply devices 200-1, 200-2 and 200-3 output a normal voltage or not, according to the output voltage decision signal GOODn and the connection state signal CONn* outputted from the plural power supply devices 200-1, 200-2 and 200-3, respectively.

Figure 2:
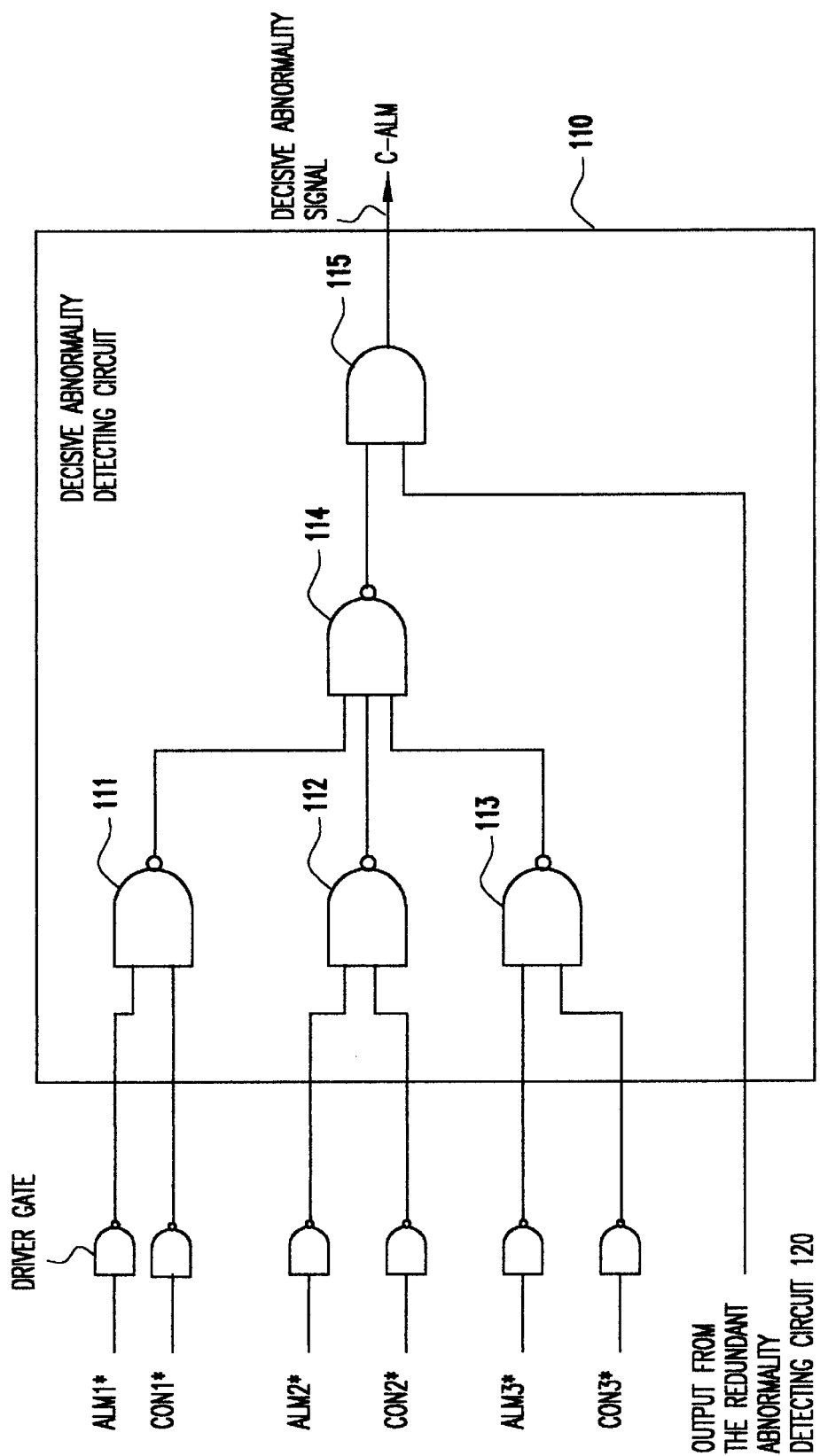
FIG. 2 is a structural diagram of a decisive abnormality detecting circuit 110 according to the first embodiment of the present invention.

Referring to FIG. 2, the decisive abnormality detecting circuit 110 includes two-input NAND gates 111, 112 and 113 that output a signal indicating whether the respective power supply devices as mounted are in the abnormal state or not, a two-input NAND gate 114 that outputs a signal indicating whether at least one abnormal power supply device exists in the respective power supply devices as mounted or not, and a two-input AND gate 115 that outputs a decisive abnormality signal C-ALM in accordance with a signal outputted from the two-input NAND gate 114 and a signal outputted from the redundant abnormality detecting circuit 120. The decisive abnormality signal C-ALM indicates that abnormality occurs even in non-redundant power supply devices which are an essential power supply devices in the structure of the power supply system among the plural power supply devices. The power supply abnormality signals ALM1*, ALM2* and ALM3* are inputted to each one input terminal of the two-input NAND gates 111, 112 and 113 through an inverter gate, respectively. The input signal CON1* is inputted to the other input terminal of the two-input NAND gate 111 through the inverter gate. The input signal CON2* is inputted to the other input terminal of the two-input NAND gate 112 through the inverter gate. The input signal CON3* is inputted to the other input terminal of the two-input NAND gate 113 through the inverter gate. The output terminal of the two-input NAND gate 111 is connected to a first input terminal of the three-input NAND gate 114. The output terminal of the two-input NAND gate 112 is connected to a second input terminal of the three-input NAND gate 114. The output terminal of the two-input NAND gate 113 is connected to a third input terminal of the three-input NAND gate 114. An output terminal of the three-input NAND gate 114 is connected to one input terminal of the two-input AND gate 115. The other input terminal of the two-input AND gate 115 is connected with the output of the redundant abnormality detecting circuit 120. From the output terminal of the two-input AND gate 115, the decisive abnormality signal C-ALM is outputted as the significant state "H" in the TTL level of.

Figure 3:
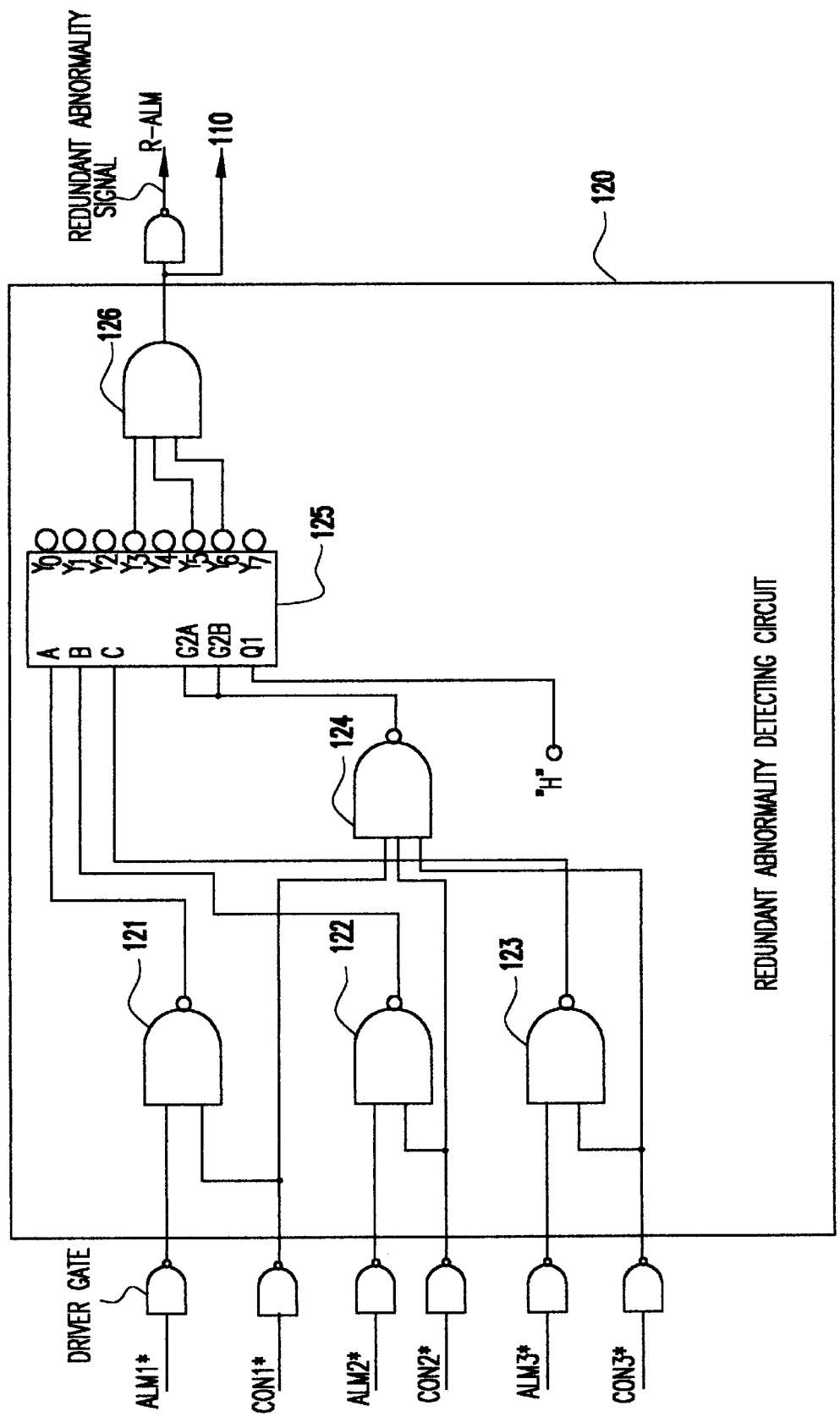
FIG. 3 is a structural diagram of a redundant abnormality detecting circuit 120 according to the first embodiment of the present invention.

Referring to FIG. 3, the redundant abnormality detecting circuit 120 includes two-input NAND gates 121, 122 and 123 that output a signal indicating that the respective power supply devices as mounted are abnormal or not, a three-input NAND gate 124 that outputs a signal indicating whether a redundant power supply device is included in the plurality of power supply devices or not, a decoder 125, and a three-input AND gate 126 which output a redundant abnormality signal R-ALM indicating whether the abnormality occurs in the redundant power supply device when the redundant power supply devices is connected to the power supply system. The power supply abnormality signals ALM1*, ALM2* and ALM3* are inputted to each one input terminals of the two-input NAND gates 121, 122 and 123 through an inverter gate, respectively. The input signal CON1* is connected to the other input terminal of the two-input NAND gate 121 and also connected to a first input terminal of the three-input NAND gate 124, through an inverter gate. The input signal CON2* is connected to the other input terminal of the two-input NAND gate 122 and also connected to a second input terminal of the three-input NAND gate 124, through an inverter gate. The input signal CON3* is connected to the other input terminal of the two-input NAND gate 123 and also connected to a third input terminal of the three-input NAND gate 124, through an inverter gate. An output terminal of the two-input NAND gate 121 is connected to a select A terminal of the decoder 125. An output terminal of the two-input NAND gate 122 is connected to a select B terminal of the decoder 125. An output terminal of the two-input NAND gate 123 is connected to a select C terminal of the decoder 125. An output terminal of the three-input NAND gate 124 is connected to enable terminals G2A and G2B of the decoder 125. The "H" level of TTL is always applied to the enable terminal G1 of the decoder 125. Output terminals Y3, Y5 and Y6 of the decoder 125 are connected to the first, second and third input terminals of the three-input AND gate 126, respectively.

FIG. 6 shows a relation between an input signal and an output signal of the decoder 125. For example, it may be used a 3-to-8 line decoder as the decoder 125.

Again referring to FIG. 3, from the output terminal of the three-input AND gate 126, the redundant abnormality signal R-ALM is outputted as the TTL level "H" through the inverter gate. Further, the output of the three-input AND gate 126 is also supplied to the other input terminal of the two-input AND gate 115.

Figure 4:
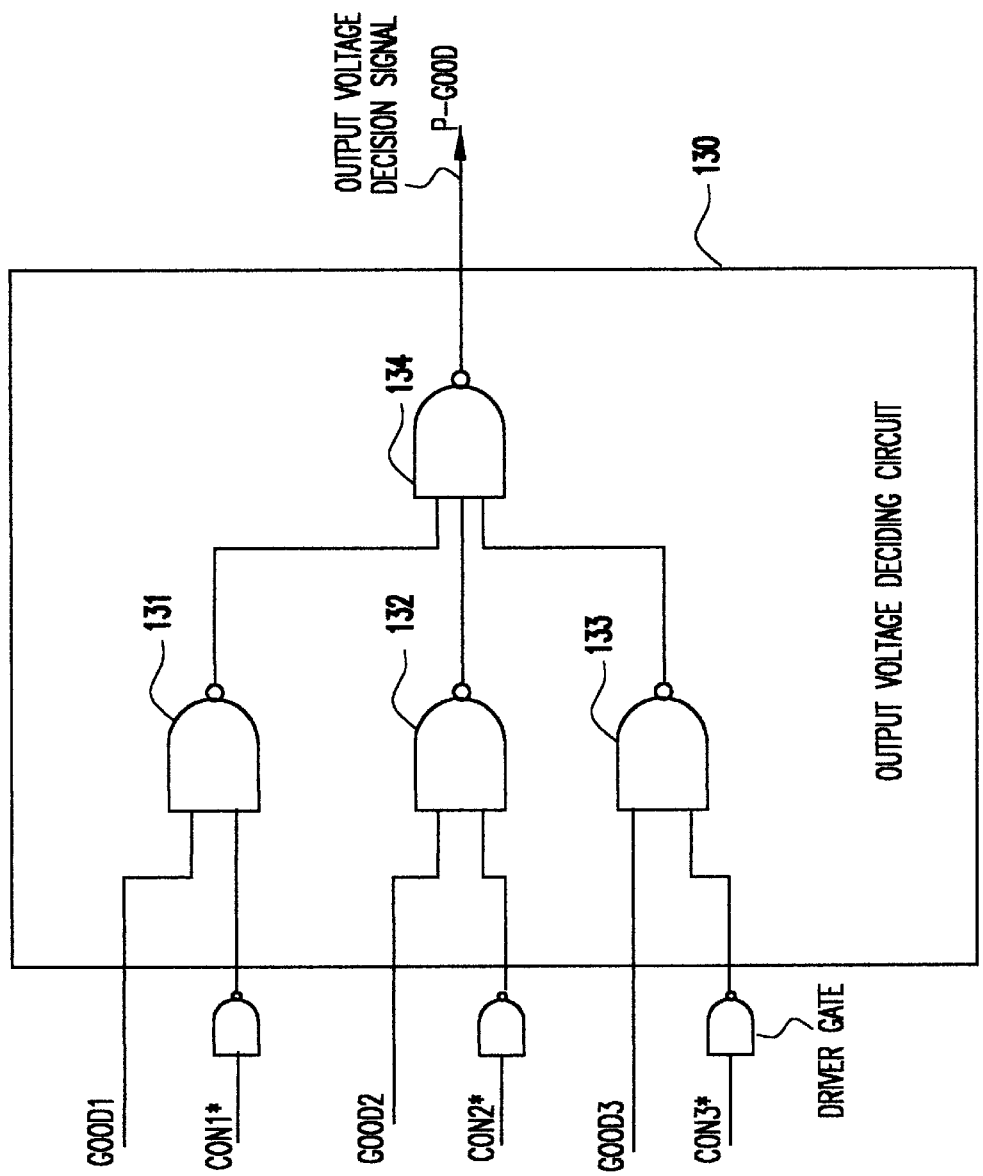
FIG. 4 is a structural diagram of an output voltage deciding circuit 130 according to the first embodiment of the present invention.

Referring to FIG. 4, the output voltage deciding circuit 130 includes two-input NAND gates 131, 132 and 133 that output a signal indicating whether an output voltage value outputted from the respective power supply devices as mounted is normal or not, and a three-input NAND gate 134 that detects whether at least one of the power supply devices which outputs a normal output voltage value exists in the plurality of power supply devices or not, and that outputs an output voltage decision signal P-GOOD indicating that the output voltage value of the power supply system is normal when at least one power supply device outputting the normal output voltage value exists. The output voltage decision signals GOOD1, GOOD2 and GOOD3 are connected to each of one input terminals of the two-input NAND gates 131, 132 and 133, respectively. The input signal CON1* is inputted to the other input terminal of the two-input NAND gate 131 through an inverter gate. The input signal CON2* is connected to the other input terminal of the two-input NAND gate 132 through an inverter gate. The input signal CON3* is connected to the other input terminal of the two-input NAND gate 133 through an inverter gate. The output terminals of the two-input NAND gates 131, 132 and 133 are inputted to the first, second and third input terminals of the three-input NAND gate 134, respectively. From the output terminal of the three-input NAND gate 134, the output voltage decision signal P-GOOD is outputted as the TTL level "H" which indicates significant state.

Then, an operation of this embodiment are described below.

Figure 5:
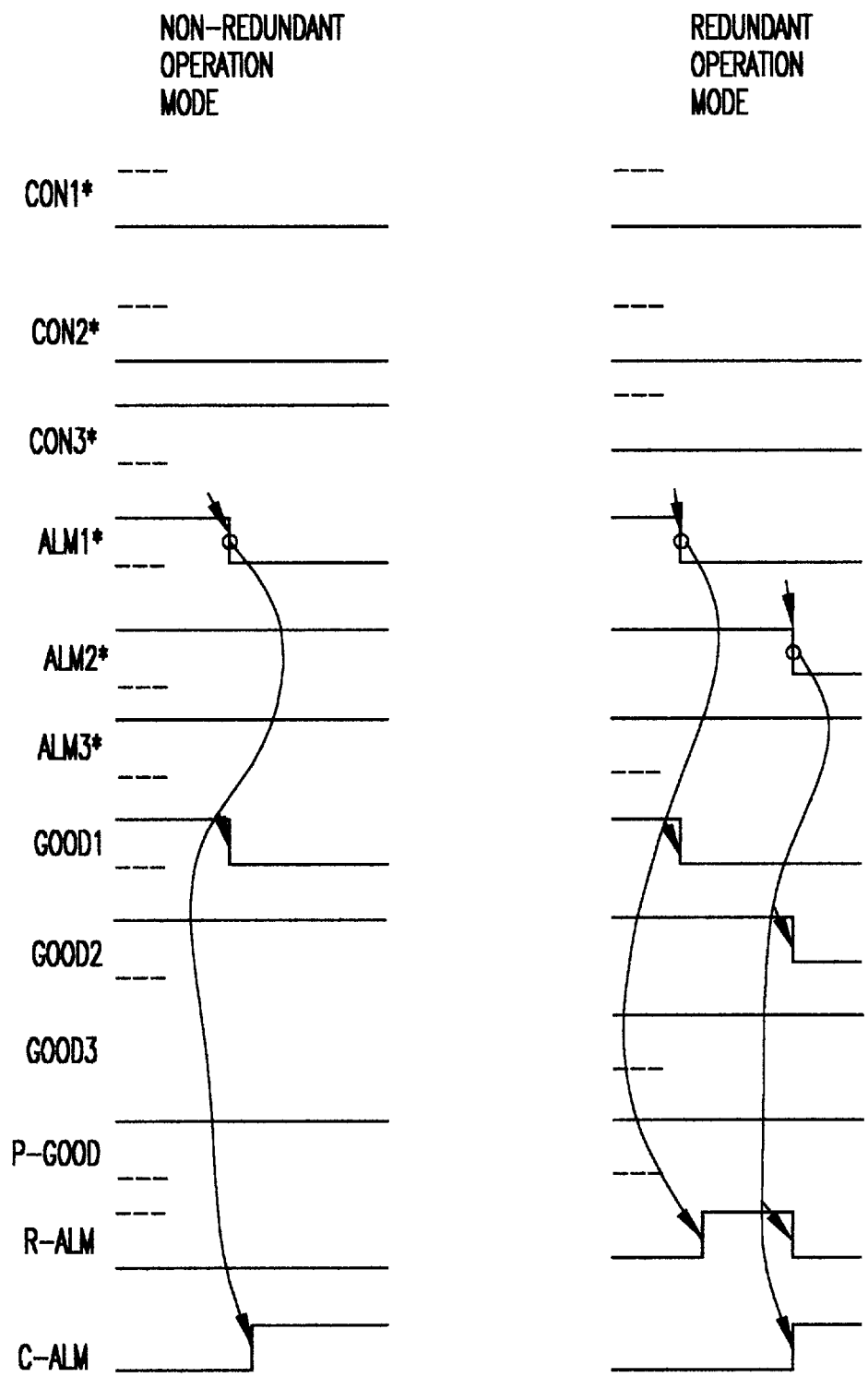
FIG. 5 is a timing chart of an operation of the first embodiment of the present invention.

Referring to FIGS. 3 and 5, in the non-redundant operation mode, that is, in the case where only two power supply devices operate in parallel, the power supply system is made up of the power supply devices 200-1 and 200-2.

In FIGS. 3, 5 and 6, because the power supply device 200-3 is not connected to the state detecting device 100, the connection state signal CON3* of the power supply device 200-3 is always "H" in TTL level, and the input signals inputted to the enable terminals G2A and G2B of the decoder 125 in the redundant abnormality detecting circuit 120 are always "H" in TTL level. As a result all of the output terminals Y3, Y5 and Y6 of the decoder 125 are "H" in TTL level, and then, the redundant abnormality signal R-ALM outputted from the redundant abnormality detecting circuit 120 through the inverter gate becomes "L" in TTL level which represents a normal state.

Referring to FIGS. 2 and 5, when the power supply devices 200-1 and 200-2 normally operate, their power supply abnormality signals ALM1* and ALM2* are "H" in TTL level, and the decisive abnormality signal C-ALM outputted through the two-input AND gate 115 of the decisive abnormality detecting circuit 110 is "L" in TTL level which represents the normal state.

In FIGS. 4 and 5, when the power supply devices 200-1 and 200-2 normally operate, the output voltage decision signals GOOD1 and GOOD2 outputted from those devices are "H" in TTL level, and the output voltage decision signal P-GOOD outputted through the three-input NAND gate 134 of the output voltage deciding circuit 130 is "H" in TTL level which represents the normal operation state.

Referring to FIGS. 2 and 5, when abnormality occurs in the power supply device 200-1 in the above state, for example, the power supply abnormality signal ALM1* of the power supply device 200-1 becomes "L" in TTL level. Therefore, the decisive abnormality signal C-ALM outputted through the two-input AND gate 115 of the decisive abnormality detecting circuit 110 changes to "H" in the TTL level which represents the decisive abnormal state.

Next, an operation of the power supply system in the redundant operation mode are described hereinafter. In the redundant operation mode, three power supply devices operate in parallel, the power supply system is made up of the power supply devices 200-1, 200-2 and 200-3.

Referring to FIGS. 2 and 5, when the power supply devices 200-1, 200-2 and 200-3 normally operate, the power supply abnormality signals ALM1* , ALM2* and ALM3* outputted from those devices are "H" in TTL level, and the decisive abnormality signal C-ALM outputted through the two-input AND gate 115 of the decisive abnormality detecting circuit 110 is "L" in TTL level which represents the normal state.

In FIGS. 3, 5 and 6, since all of the connection state signals CON1*, CON2* and CON3* of the power supply devices 200-1, 200-2 and 200-3, respectively, are "L" in TTL level, the input signals inputted to the enable terminals G2A and G2B of the decoder 125 in the redundant abnormality detecting circuit 120 are always "L" in TTL level. Further, because the power supply abnormality signals ALM1*, ALM2* and ALM3* of the power supply devices 200-1, 200-2 and 200-3, respectively, are "H" in TTL level, the level "H" of TTL is inputted to the select terminals A, B and C of the decoder 125 in the redundant abnormality detecting circuit 120, respectively. As a result, all of the output terminals Y3, Y5 and Y6 of the decoder 125 become "H" in TTL level, and the redundant abnormality signal R-ALM outputted through the inverter gate becomes "L" in TTL level which represents that the abnormality does not occur in the redundant power supply device.

Referring to FIGS. 4 and 5, when the power supply devices 200-1, 200-2 and 200-3 normally operate, the output voltage decision signals GOOD1, GOOD2 and GOOD3 outputted from those devices are "H" in TTL level, and the output voltage decision signal P-GOOD outputted from the three-input NAND gate 134 of the output voltage deciding circuit 130 is "H" in TTL level which represents that the output voltage value of the power supply system is normal.

Then, an operation of the power supply system in a case where abnormality occurs in at least one of the power supply devices while the power supply system is operating in the redundant operation mode.

In FIGS. 3, 5 and 6, when abnormality occurs in the power supply device 200-1, for example, the power supply abnormality signal ALM1* outputted from the power supply device 200-1 becomes "L" in TTL level. As a result, in the redundant abnormality detecting circuit 120, only the select terminal A of the select terminals A, B and C of the decoder 125 becomes "L" in TTL level, and then, the output terminal Y6 of the decoder 125 becomes "L" in TTL level. The signal "L" in TTL level outputted from the output terminal Y6 of the decoder 125 in the redundant abnormality detecting circuit 120 is inputted to the third input terminal of the three-input AND gate 126, and the output terminal of the three-input AND gate 126 becomes "L" in TTL level. For that reason, the redundant abnormality signal R-ALM outputted through a driver gate from the redundant abnormality detecting circuit 120 becomes "H" in TTL level which represents that the abnormality occurs in at least one of the redundant power supply devices. The signal "L" in TTL level outputted from the output terminal of the three-input AND gate 126 of the redundant abnormality detecting circuit 120 is inputted to the other input terminal of the two-input AND gate 115 in the decisive abnormality detecting circuit 110.

Referring to FIGS. 2 and 5, in the decisive abnormality detecting circuit 110, the signal ALM1* "L" in TTL level is inputted from the power supply device 200-1 in which abnormality occurs to one input terminal of the two-input NAND gate 111 through the inverter gate. Since the power supply device 200-1 in which abnormality occurs is still connected to the power supply system, the signal CON1* "L" in TTL level outputted from the power supply device 200-1 is inputted to the other input terminal of the two-input NAND gate 111 through the inverter gate. For this reason, from the output terminal of the two-input NAND gate 111, the output signal "L" in TTL level which represents that abnormality occurs in the power supply device 200-1 as mounted is inputted to the three-input NAND gate 114. The three-input NAND gate 114 outputs "H" in TTL level to one input terminal of the two-input AND gate 115. Since the signal "L" in TTL level outputted from the three-input AND gate 126 of the redundant abnormality detecting circuit 120 is inputted to the other input terminal of the two-input AND gate 115, the two-input AND gate 115 outputs the decisive abnormality signal C-ALM whose value is "L" in TTL level representing that the power supply system is not in the decisive abnormal state.

In this way, even if abnormality occurs in redundancy of the power supply devices, because the redundant abnormality signal R-ALM exhibits that the redundant power supply device is merely abnormal, and because the decisive abnormality signal C-ALM does not exhibit the abnormality, it can be recognized from the outside of the power supply system that only the redundancy is abnormal among the power supply devices, and also the power supply system can operate without stopping the power supply system per se.

Next, an operation of the power supply system in a case where further abnormality occurs even in the power supply device 200-2 in addition to the power supply device 200-1 will be described.

Referring to FIGS. 5 and 6, in the redundant abnormality detecting circuit 120, when abnormality occurs in the power supply device 200-2, the power supply abnormality signal ALM2* outputted from the power supply device 200-2 becomes "L" in TTL level. For that reason, not only the select terminal A of the decoder 125 but also the signal inputted to the select terminal B become "L" in TTL level, and all of the output terminals Y3, Y5 and Y6 of the decoder 125 output "H" in TTL level. As a result, the output of the three-input AND gate 126 becomes "H" in TTL level, and then, the redundant abnormality signal R-ALM outputted through the inverter gate becomes "L" in TTL level which represents that it is not in the redundant abnormal state.

Referring to FIGS. 2 and 5, the output signal from the output terminal of the three-input AND gate 126 which is inputted to the other input terminal of the two-input AND gate 115 changes to "H" in TTL level. Further, in the decisive abnormality detecting circuit 110, since the signal "H" in TTL level which represents that abnormality occurs in at least one of the mounted power supply devices is inputted to one input terminal of the two-input AND gate 115 from the three-input NAND gate 114, the decisive abnormality signal C-ALM outputted from the output terminal of the two-input AND gate 115 becomes "H" in TTL level which represents that it is in the decisive abnormal state.

In this way, in this embodiment, because the decisive abnormality detecting circuit 110 outputs the decisive abnormality signal C-ALM only when the number of the abnormal power supply devices exceeds the number of the redundant power supply devices, the abnormality can be distinguished between a abnormality which does not need to stop the power supply system and the decisive abnormality which needs to stop the power supply system.

Figure 7:
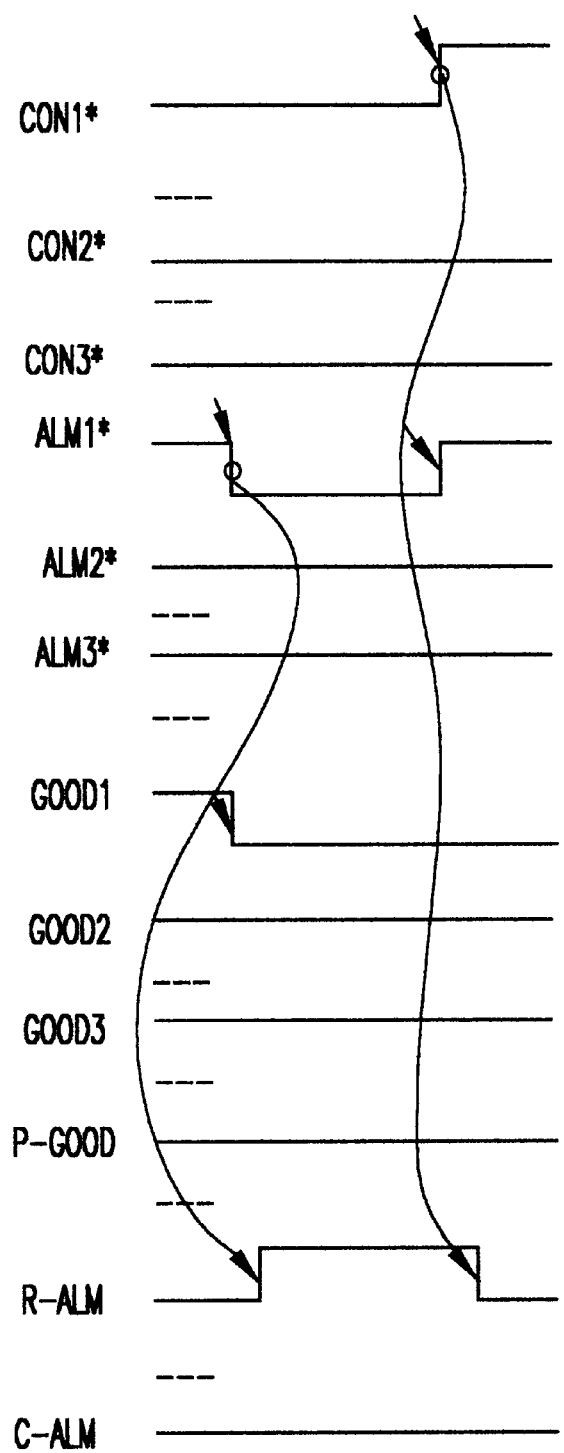
FIG. 7 is a timing chart when an abnormal power supply device is replaced by a new one by Hot Swap according to the first embodiment of the present invention.

Then, a second embodiment of the present invention is described below in detail, referring to the drawings. In case of the redundant operation mode, the state detecting device 100 of the power supply system, according to the above-described first embodiment, outputs the redundant abnormality signal when the abnormality occurs in one power supply device. When the abnormal power supply device is replaced by a normal one by Hot Swap for maintenance, however, the redundant abnormality signal is canceled by extracting the abnormal power supply device as follows:

In FIG. 7, when abnormality occurs in the power supply device 200-1, because the power supply abnormality signal ALM1* and the connection state signal CON1* which are outputted from the power supply device 200-1 is "L" in TTL level, the redundant abnormality signal R-ALM becomes "H" in TTL level which represents that the power supply system is in the redundant abnormal state. Then, when the power supply device 200-1 is extracted from the power supply system by Hot Swap, the power supply abnormality signal ALM1* inputted to the state detecting circuit 100 changes from "L" to "H" in TTL level. This is because the power supply abnormality signal ALMn* is pulled up to become "H" in TTL level when a corresponding power supply device is not connected to the power supply system, whereby the power supply system can operate in any one of the non-redundant operation mode or the redundant operation mode. At the same time, since the power supply device 200-1 is not mounted on the power supply system, the connection state signal CON1* changes from "L" to "H" in TTL level. In this manner, in the redundant abnormality detecting circuit 120, because the power supply abnormality signal ALM1* and the connection state signal CON1* change, the terminal A of the decoder 125 changes from "L" to "H" in TTL level, and all of the output terminals Y3, Y5 and Y6 of the decoder 125 become "H" in TTL level. For that reason, the redundant abnormality signal R-ALM outputted through the inverter gate becomes "L" in TTL level which represents that the power supply system is not in the redundant abnormal state. Therefore, a host monitor device (not shown) monitoring the redundant abnormal state monitors as if the redundant abnormality signal R-ALM has not asserted.

The feature of the second embodiment resides in that the power supply system includes a holding circuit 400 that holds the redundant abnormality signal R-ALM for a predetermined time, and an updating circuit 300 that resets the redundant abnormality signal R-ALM after a lapse of the predetermined time for which the holding circuit 400 holds the redundant abnormality signal R-ALM.

Figure 8:
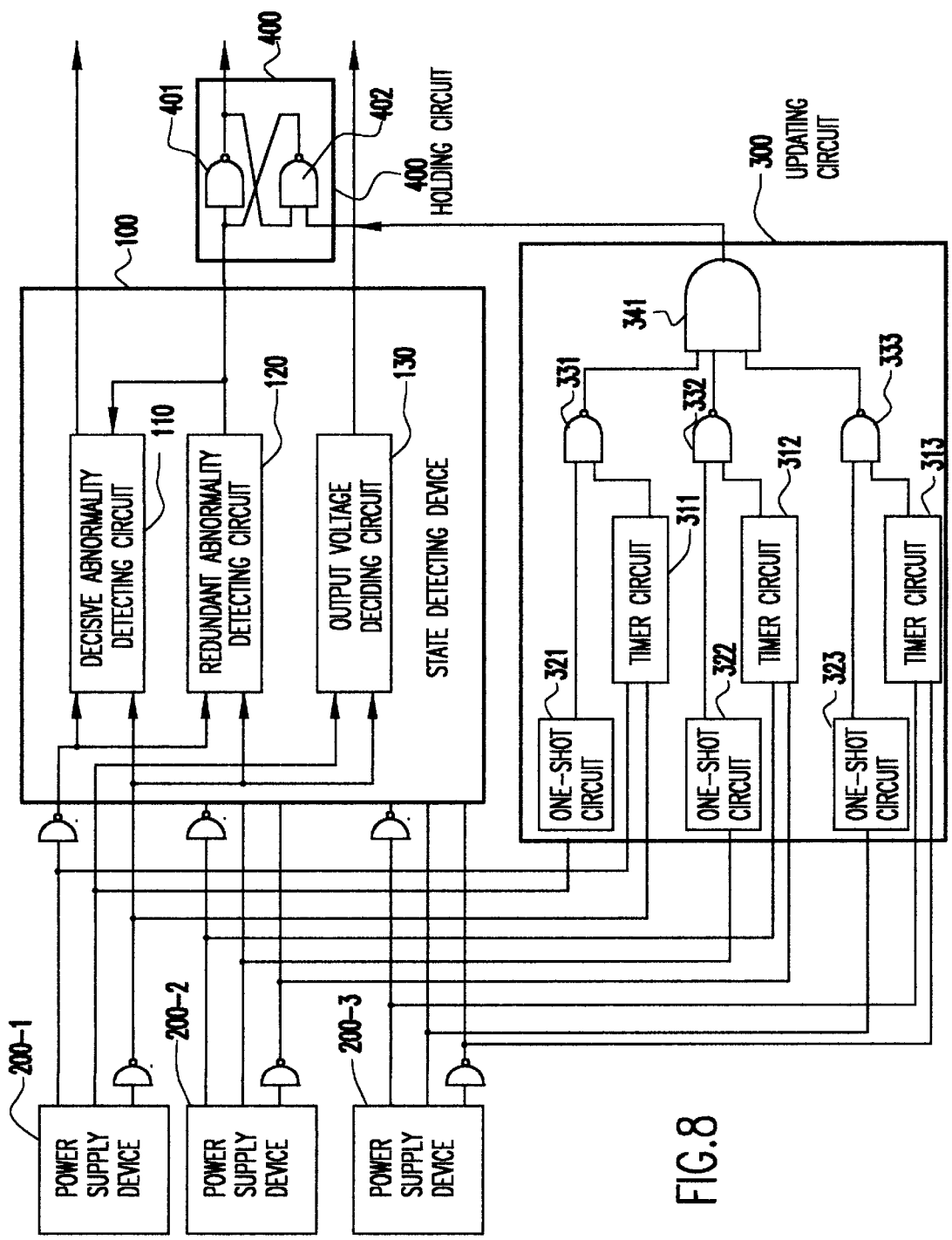
FIG. 8 is a structural diagram of a second embodiment of the present invention.

Referring to FIG. 8, the updating circuit 300 includes one-shot circuits 321, 322 and 323 each of which is provided for each of a plurality of the power supply devices 200-1, 200-2 and 200-3 to output a fine-width pulse, and timer circuits 311, 312 and 313 each of which is provided for each of a plurality of the power supply devices 200-1, 200-2 and 200-3 to prevent the holding circuit 400 from being reset by a chatter in case of Hot Swap. The power supply abnormality signals ALM1*, ALM2* and ALM3* outputted from the plurality of power supply devices 200-1, 200-2 and 200-3 are inputted to one input terminals of the timer circuits 311, 312 and 313, respectively. The output voltage decision signals GOOD1, GOOD2 and GOOD3 outputted from the plurality of power supply devices 200-1, 200-2 and 200-3 are inputted to the respective one-shot circuits 321, 322 and 323, respectively. The connection state signals CON1*, CON2* and CON3* outputted from the plurality of power supply devices 200-1, 200-2 and 200-3 are inputted to the other input terminals of the timer circuits 311, 312 and 313 through the inverter gates, respectively. The output terminal of the one-shot circuit 321 and the output terminal of the timer circuit 311 are connected to one input terminal and the other input terminal of the two-input NAND gate 331, respectively. The output terminal of the one-shot circuit 322 and the output terminal of the timer circuit 312 are connected to one input terminal and the other input terminal of the two-input NAND gate 332, respectively. The output terminal of the one-shot circuit 323 and the output terminal of the timer circuit 313 are connected to one input terminal and the other input terminal of the two-input NAND gate 333, respectively. The output terminals of the two-input NAND gates 331, 332 and 333 are connected to the first, second and third input terminals of the three-input AND gate 341, respectively. The output terminal of the three-input AND gate 341 is connected to the holding circuit 400. The holding circuit 400 includes two-input NAND gates 401 and 402. One input terminal of the two-input NAND gate 401 receives the output signal from the redundant abnormality detecting circuit 120 of the state detecting circuit 100. The other input terminal of the two-input NAND gate 401 receives the output of the two-input NAND gate 402. From the output terminal of the two-input NAND gate 401, the redundant abnormality signal R-ALM is outputted. One input terminal of the two-input NAND gate 402 receives a signal outputted from the updating circuit 300. The other input terminal of the two-input NAND gate 402 receives the output of the two-input NAND gate 401.

Figure 9:
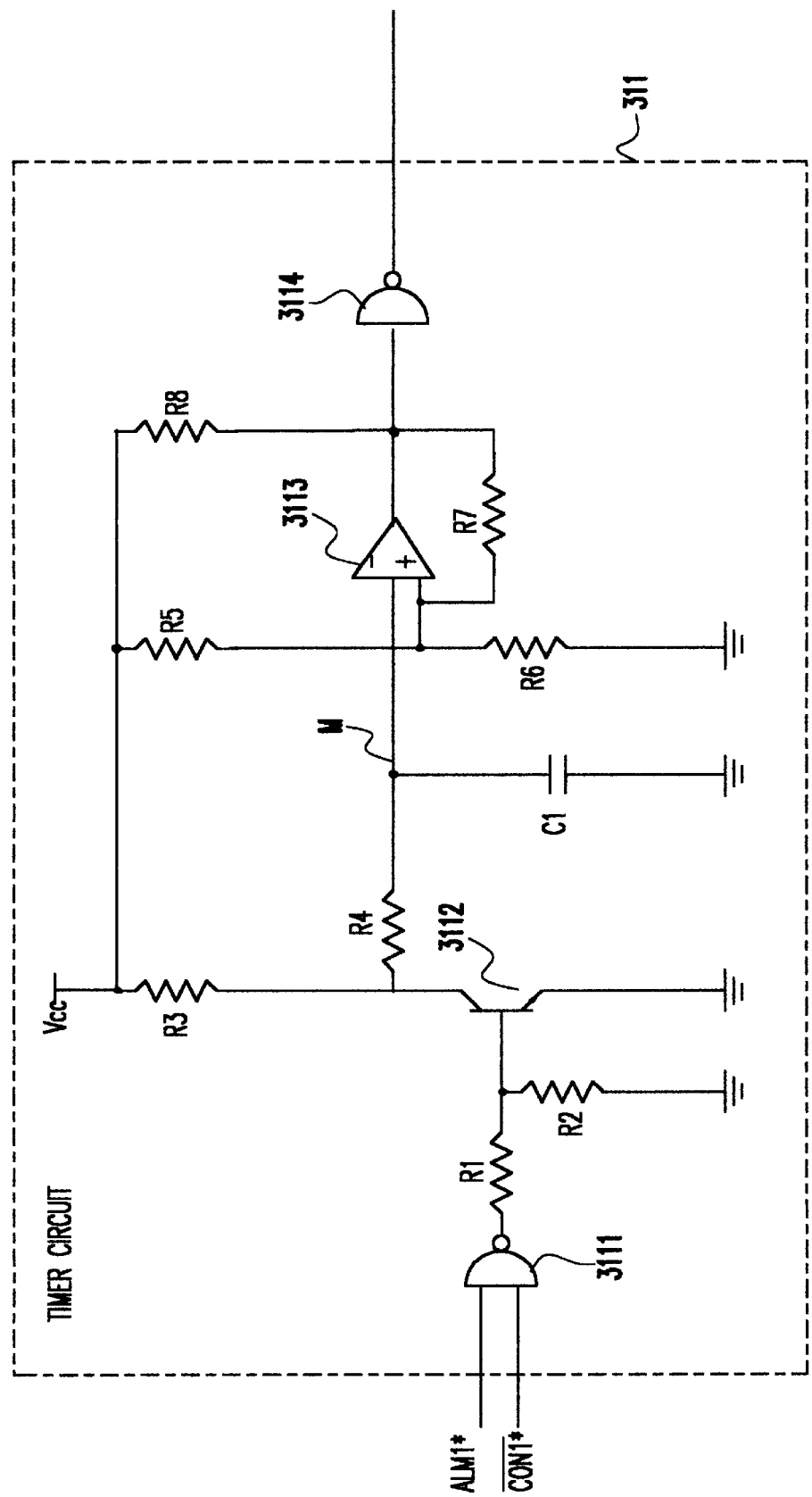
FIG. 9 is a structural diagram of a timer circuit according to the second embodiment of the present invention.

Referring to FIG. 9, the timer circuit 311 includes resistors R1, R2, R3, R4, R5, R6, R7 and R8, a two-input NAND gate 3111, a transistor 3112, a capacitor C1, a comparator 3113, and a driver gate 3114. The power supply abnormality signal ALM1* and the connection state signal CON1* are inputted to the two-input NAND gate 3111. The output of the two-input NAND gate 3111 is connected to the base terminal of the transistor 3112 and one end of the resistor R2 through the resistor R1. The other end of the resistor R2 is connected to the ground potential. The collector terminal of the transistor 3112 is connected to VCC through the resistor R3 and connected to one end of the resistor R4, and the emitter terminal of the transistor 3112 is connected to the ground potential. The other end of the resistor R4 is connected to one end of the capacitor C1 and also connected to an inverting input terminal of the comparator 3113. The other end of the capacitor C1 is connected to the ground potential. A non-inverting input terminal of the comparator 3113 is connected to the power supply VCC through the R5 and also connected to the ground potential through the resistor R6. An output signal of the comparator 3113 is outputted through the driver gate 3114 as an output signal of the timer circuit 311. Also, the output of the comparator 3113 is connected to the power supply VCC through the resistor R8 and also connected to a second input of the comparator 3113 through the resistor R7. The same structure is applied to the circuit structure of other timer circuits 312 and 313.

Figure 10:
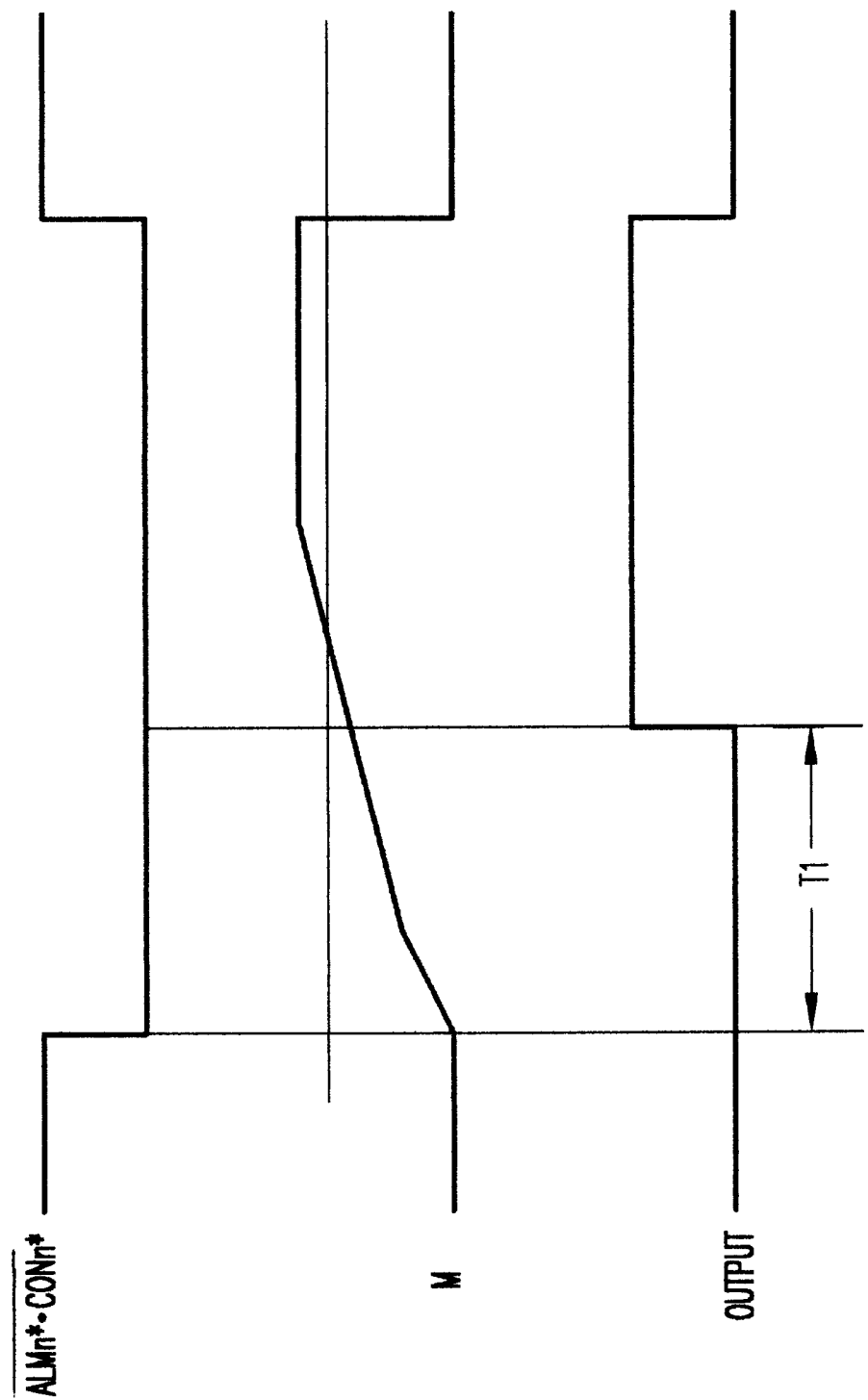
FIG. 10 is a timing chart of a timer circuit according to the second embodiment of the present invention.

Referring to FIG. 10, the timer circuits 311, 312 and 313 output an output signal "H" in TTL level as the significant state after a lapse of predetermined time T1 since the inverse levels of two input signals, that is, the power supply abnormality signal ALMn* and the connection state signal CONn* become "H" in TTL level. The symbol M is a waveform at a middle point of FIG. 9.

Figure 11:
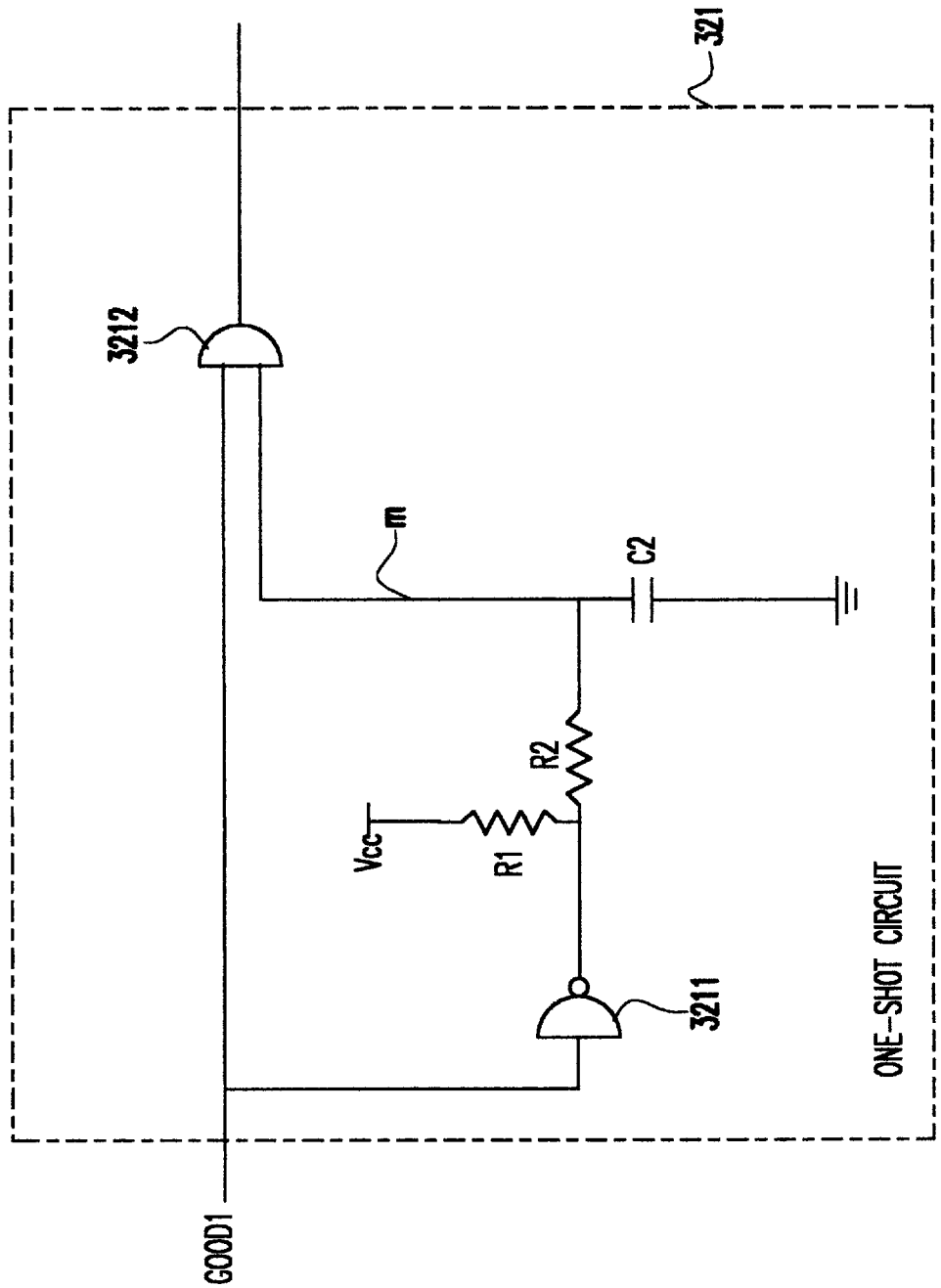
FIG. 11 is a structural diagram of a one-shot circuit according to the second embodiment of the present invention.

Referring to FIG. 11, the one-shot circuit 321 includes an inverter 3211, resistors r1 and r2, a capacitor C2 and an AND gate 3212. The output voltage decision signal GOOD1 inputted to the one-shot circuit 321 is inputted to the inverter 3211 and the first input terminals of the AND gate 3212. The output of the inverter 3211 is connected to the power supply VCC through the resistor r1 and also inputted to the second input terminal of the AND gate 3212 through the resistor r2. The second input terminal of the AND gate 3212 is connected to the ground potential through the capacitor C2. The same circuit structure is applied to the one-shot circuits 322 and 323.

Figure 12:
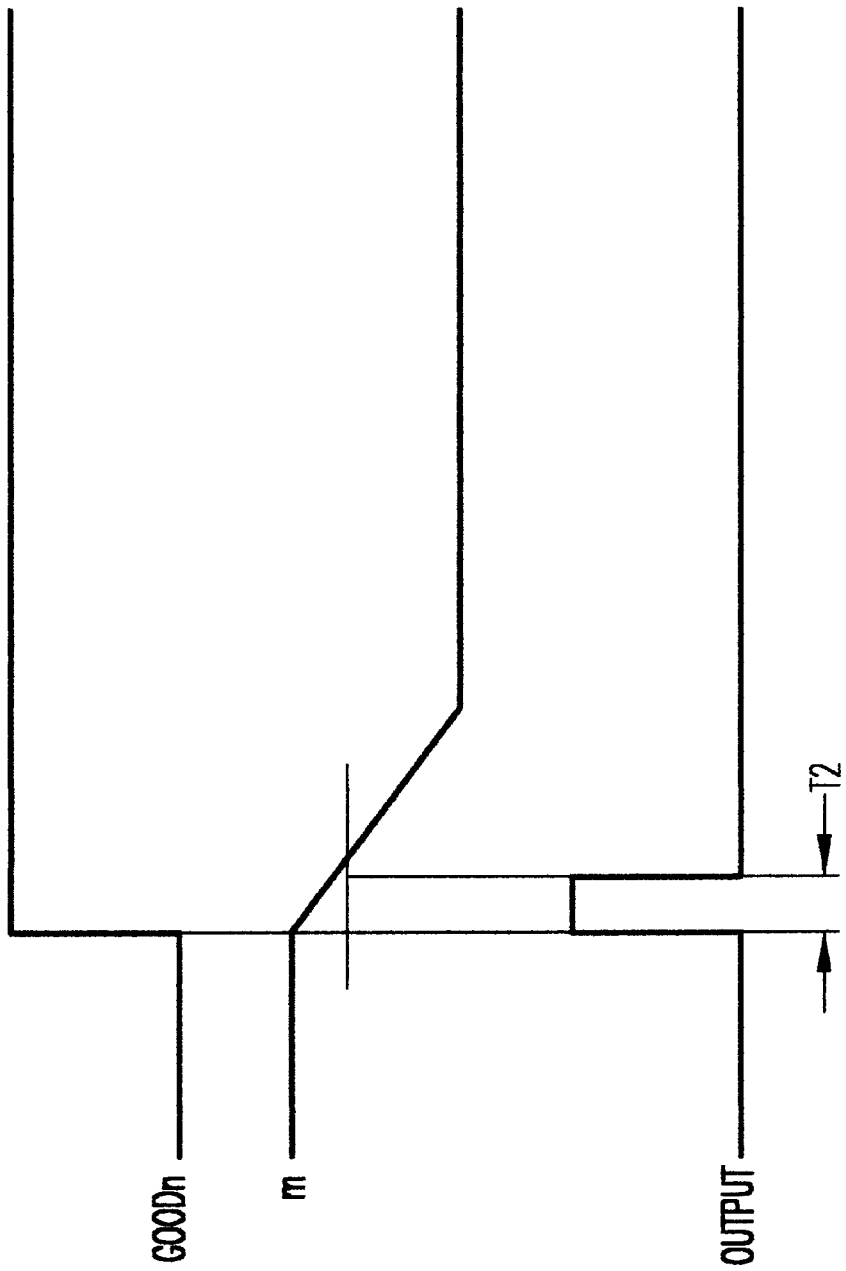
FIG. 12 is a timing chart of the one-shot circuit according to the second embodiment of the present invention.

Referring to FIG. 12, the respective one-shot circuits 321, 322 and 323 output a pulse signal "H" as the significant state in TTL level for a second predetermined time T2 every time the input signal, that is, the output voltage decision signal GOODn changes from "L" to "H" in TTL level. The symbol m is a waveform at a middle point of FIG. 11.

Next, an operation of this embodiment is described below.

Figure 13:
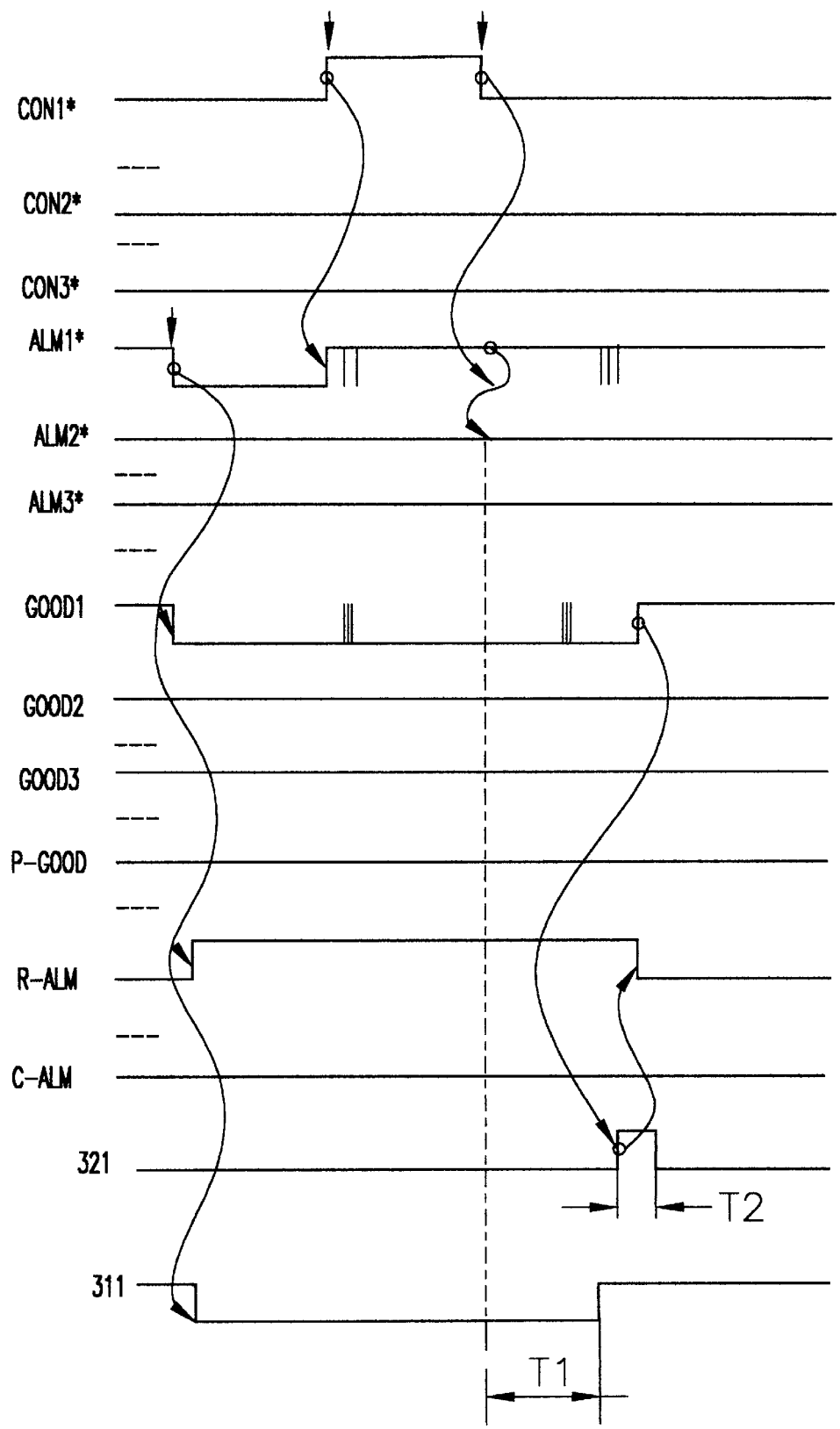
FIG. 13 is a timing chart of the second embodiment of the present invention.

Referring to FIGS. 8 and 13, in a case where abnormality occurs in the power supply device 200-1, the power supply device 200-1 is replaced by a normal one by Hot Swap. In accordance with the abnormality in the power supply device 200-1, the power supply abnormality signal ALM1* and the connection state signal CON1* outputted from the power supply device 200-1 change to "L" in TTL level, and then, a signal outputted from the redundant abnormality detecting circuit 120 becomes "H" in TTL level which represents the redundancy is merely in abnormality state. When the power supply device 200-1 is extracted from the power supply system Hot Swap, the power supply abnormality signal ALM1* and the connection state signal CON1* change from "L" to "H" in TTL level. As a result, the terminal A of the decoder 125 changes from "L" to "H" in TTL level, and all of the output terminals Y3, Y5 and Y6 of the decoder 125 become "H" in TTL level. In this manner, the output of the three-input AND gate 126 changes from "H" in TTL level which represents that the power supply system is in the redundant abnormality state to "L" in TTL level which represents that the power supply system is not in the redundant abnormality state. However, the holding circuit 400 holds the signal outputted from the redundant abnormality detecting circuit 120 as "H" in TTL level which represents the redundancy is in the abnormality state. Then, the normal power supply device is inserted in the mount place of the power supply device 200-1 as a alternative by Hot Swap. The connection state signal CON1* changes from an unsettled TTL level or the TTL level "H" which represents that the power supply device 200-1 is not connected to the power supply system to the TTL level "L" which represents that the power supply device 200-1 is connected to the power supply system. The power supply abnormality signal ALM1* settles from an unsettled TTL level or the TTL level "H" which represents that the power supply system is not abnormal to "H" in TTL level which represents that it is not abnormal. The output voltage decision signal GOOD1 changes from an unsettled TTL level or the TTL level "L" which represents that the output voltage value is not normal to "H" in TTL level which represents that the output voltage value is normal after a lapse of a predetermined time since a power supply turn-on signal not shown is inputted to the power supply device 200-1. The one-shot circuit 321 outputs a narrow width pulse at a timing when the output voltage decision signal GOOD1 changes to "H" in TTL level. The pulse outputted from the one-shot circuit 321 is inputted to the holding circuit 400 to reset the signal outputted from the redundant abnormality detecting circuit 120 held by the holding circuit 400.

The power supply device 200-1 is connected to the power supply system through physical connection due to contact of a connector or the like. For this reason, in the case where the power supply device 200-1 is inserted by Hot Swap, the chatter of several millisecond to several dozens of millisecond duration may occur in the respective signals of the connection state signal CON1*, the power supply abnormality signal ALM1* and the output voltage decision signal GOOD1 or the connection order of the respective signals may get unfixed. In the updating circuit 300, when the output voltage decision signal GOOD1 is chattered, the one-shot circuit 321 outputs a pulse. The timer circuits 311, 312 and 313 prevent the pulse which the one-shot circuit 321 outputs from resetting the redundant abnormality signal R-ALM. As a result, the predetermined time T1 of the timer circuits 311, 312 and 313 is set such that it becomes sufficiently longer than a time which the chatter is arising when the power supply device 200-1 is inserted to the power supply system. On the other hand, the predetermined time T1 is set so as not to exceed a time from the power supply turn-on signal is inputted to the power supply device 200-1 to the connection state signal CON1 is fixed to the TTL level "H". More particularly, it is desirable that the predetermined time T1 is 100 to 200 millisecond. Moreover, the predetermined time T2 of the pulse outputted from the one-shot circuits 321, 322 and 323 is set such that it becomes sufficiently longer than the reset time of the holding circuit 400. More particularly, it is preferable that the predetermined time T2 is 1 to 2 millisecond.

As described above, in this embodiment, even if the signal outputted from the redundant abnormality detecting circuit 120 is canceled when the abnormal power supply device 200-1 is extracted from the power supply system by Hot Swap, because the holding circuit 400 holds the signal outputted from the redundant abnormality detecting circuit 120, the redundant abnormality signal R-ALM is prevented from being canceled. Further, in this embodiment, the power supply system is designed in such a manner that the timer circuits 311, 312 and 313 are provided, and the holding circuit 400 is reset first when the output voltage value of the power supply device 200-1 becomes normal after the power supply device 200-1 is inserted into the power supply system. With this structure, the redundant abnormality signal R-ALM can be prevented from being reset by the chatter when the power supply device 200-1 which has been replaced by a normal one is inserted into the power supply system by Hot Swap.

In the above embodiment, while the decoder 125 is provided in the redundant abnormality detecting circuit 120, the present invention is not limited by or to this structure. It is possible to use any logic circuit that can output a signal representing whether abnormality occurs in the redundant power supply device or not. Moreover, in the above-mentioned embodiments, while the circuit is formed by the TTL circuit, the TTL circuits may be replaced by emitter coupled logic (ECL) circuits or complementary metal oxide semiconductor (CMOS) circuits.

While this invention has been described in conjunction with the preferred embodiments thereof, it will now readily be possible for those skilled in the art to put this application into practice in various other manners.

What is claimed is:

1. A power supply system comprising:
   a plurality of power supply devices including M (M is an integer number greater than one) redundant power supply devices; and
   a first abnormality detecting element which detects that an abnormality occurs in at least one of said M redundant power supply devices in accordance with first signals outputted from said power supply devices, each of said first signals indicates a corresponding one of said power supply devices is in an abnormal state.

2. The power supply system as claimed in claim 1, wherein said first abnormality detecting element comprises:
   a first detecting element which detects that said plurality of power supply devices include an abnormal power supply device;
   a second detecting element which detects that at least one of said plurality of power supply devices is the redundant power supply device; and
   a third detecting element which detects that the abnormality occurs in the redundant power supply device when said second detecting element detects that at least one of said plurality of power supply devices is the redundant power supply device.

3. The power supply as claimed in claim 1, further comprising:
   a second abnormality detecting element which detects that the abnormality occurs in at least one of an essential power supply devices for the power supply system in accordance with a detection result from said first detecting element and said signals outputted from said power supply devices, each of said first signals indicates a corresponding one of said power supply devices is in an abnormal state.

4. The power supply system as claimed in claim 3, wherein said second abnormality detecting element comprises:
   a first detecting element which detects that said plurality of power supply devices include an abnormal power supply device; and
   a second detecting element which detects that the number of the abnormal power supply devices is larger than M in accordance with a detection result from said first detecting element and said detection result outputted from said first abnormality detecting element.

5. The power supply system, as claimed in claim 1, further comprising:
   a decision element which decides that the output voltage is normal when at least one of said plurality of power supply devices is normal.

6. The power supply system as claimed in claim 5, wherein said decision element comprises:
   a first detecting element which detects that output voltage values outputted from each of said power supply devices is normal; and
   a second detecting element which detects that at least one of the output voltage values is normal in accordance with said detection result from said first detecting element.

7. The power supply system as claimed in claim 1, wherein each of said power supply devices outputs a second signal indicating that each of said power supply devices are connected to said power supply system; and
   wherein said first abnormality detecting element detects that the redundant power supply device of said plurality of power supply devices is abnormal by using said first signals and said second signals.

8. A power supply system comprising:
   a plurality of power supply devices including M (M is an integer number greater than zero) redundant power supply devices;
   an abnormality detecting element which detects that an abnormality occurs in at least one of said M redundant power supply devices in accordance with first signals indicating each of said power supply devices is in an abnormal state, each of said first signals indicates a corresponding one of said power supply devices is in an abnormal state; and a holding element which holds a detection result outputted from said first abnormality detecting element.

9. The power supply system as claimed in claim 8, further comprising an updating element which stops said holding element from holding said detection result after a lapse of a predetermined time.

10. The power supply system as claimed in claim 9, wherein an abnormal power supply device is removed and replaced by a normal power supply device without stopping said power supply system during said holding element holds said detection result.

11. The power supply system as claimed in claim 10, wherein said updating element stops said holding element from holding said detection result, when the output voltage decision signal outputted from the normal power supply device which has been replaced changes from a state indicating that the output voltage is infinite to a state indicating that the output voltage is finite.

12. A power supply system comprising:

a plurality of power supply devices; and a state detecting element which detects an abnormality occurred in a redundant power supply device when at least one of said power supply devices is said redundant power supply device, or which detects a decisive abnormality if the abnormality occurs in at least one of said power supply devices when each of said power supply devices is essential for supplying a voltage to a load.

* * * * *